United States Patent Office 3,298,474
Patented Jan. 17, 1967

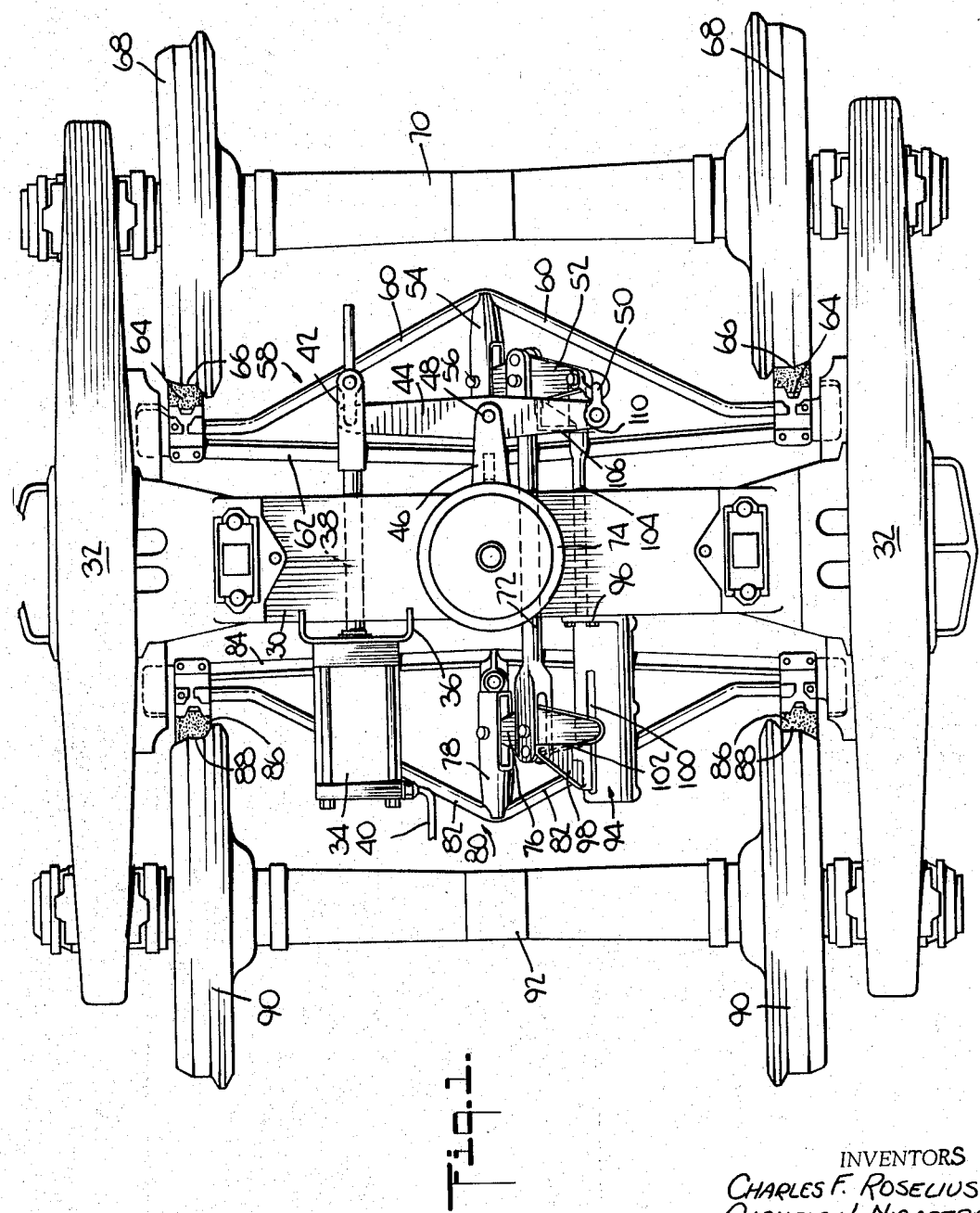

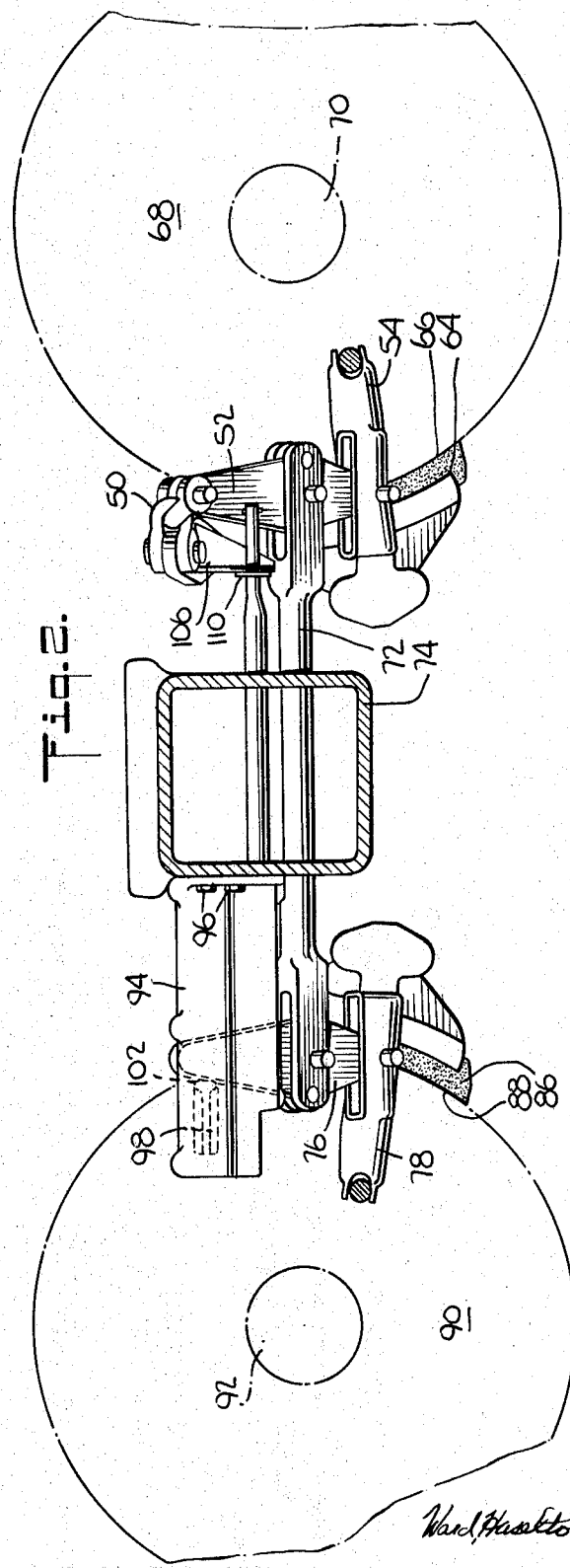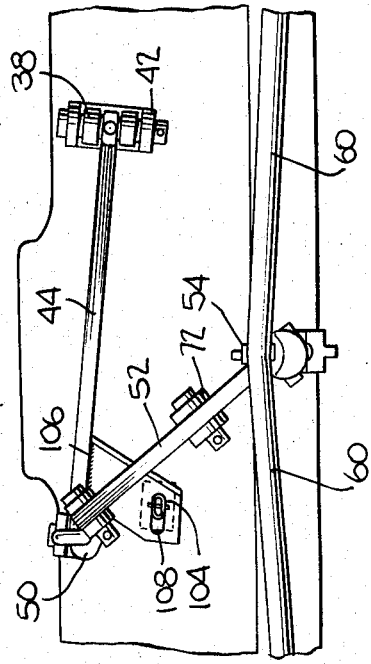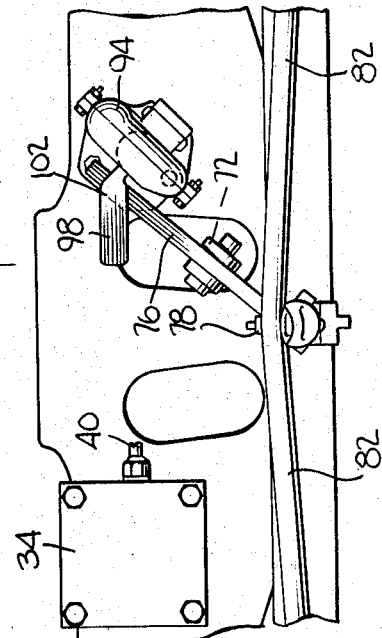

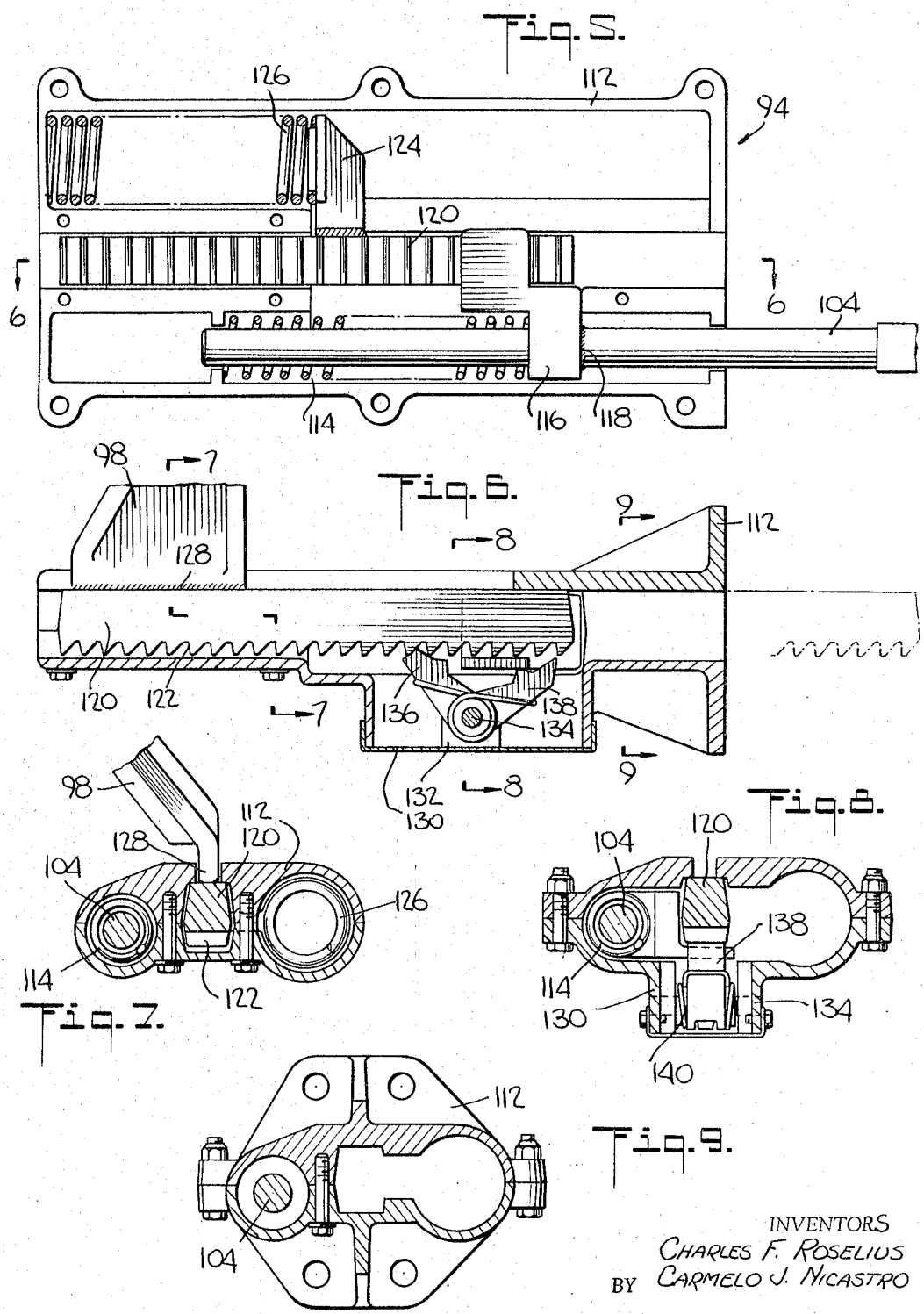

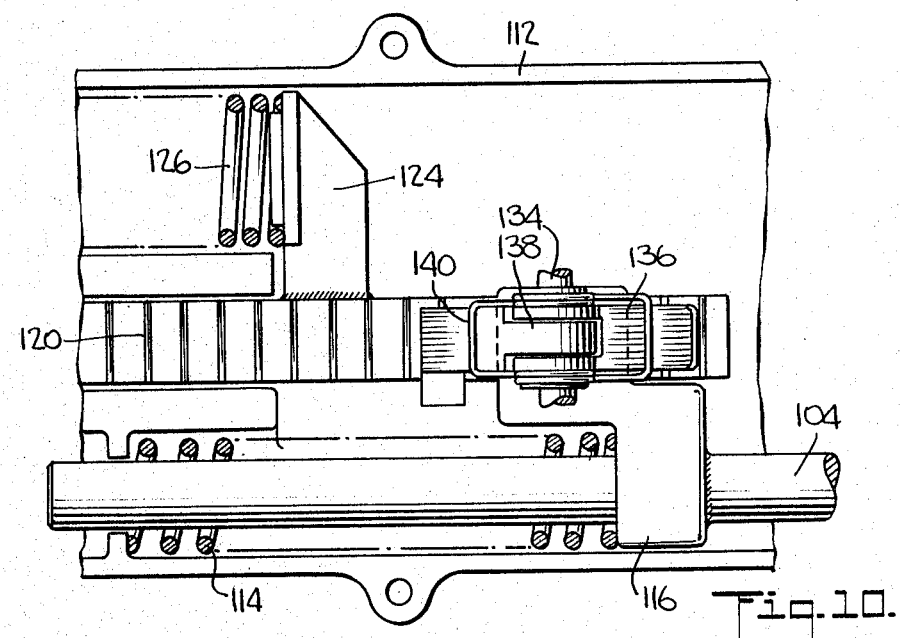
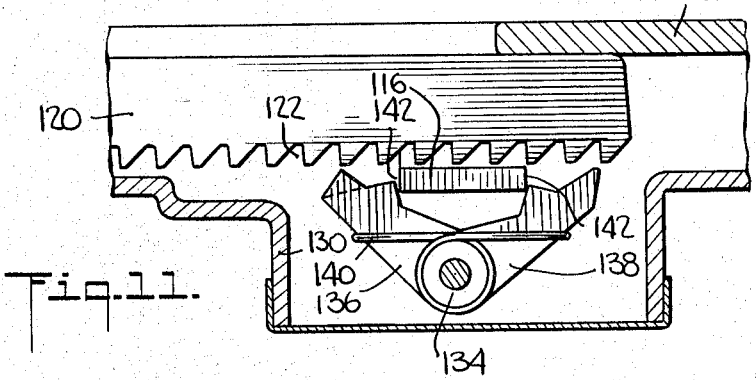
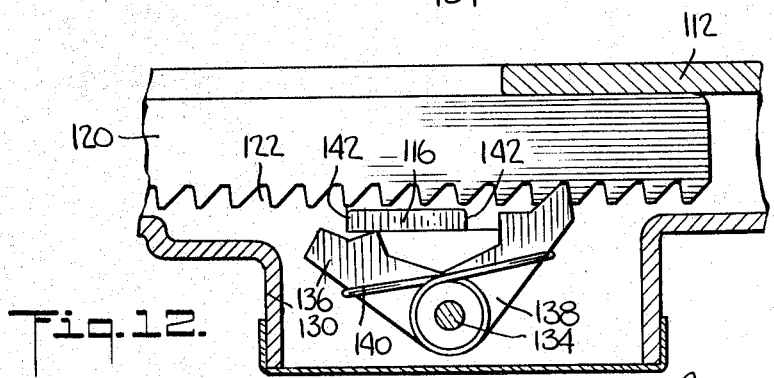

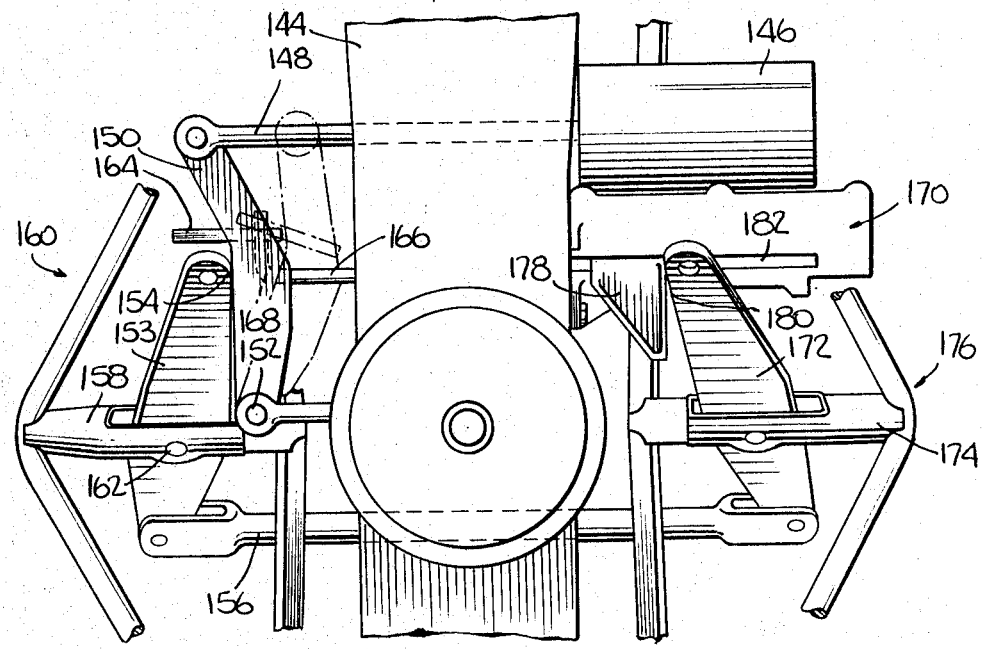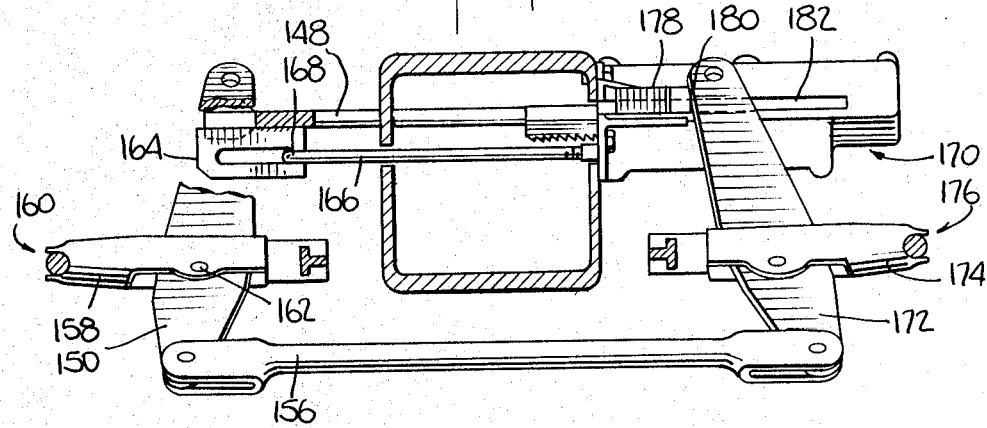

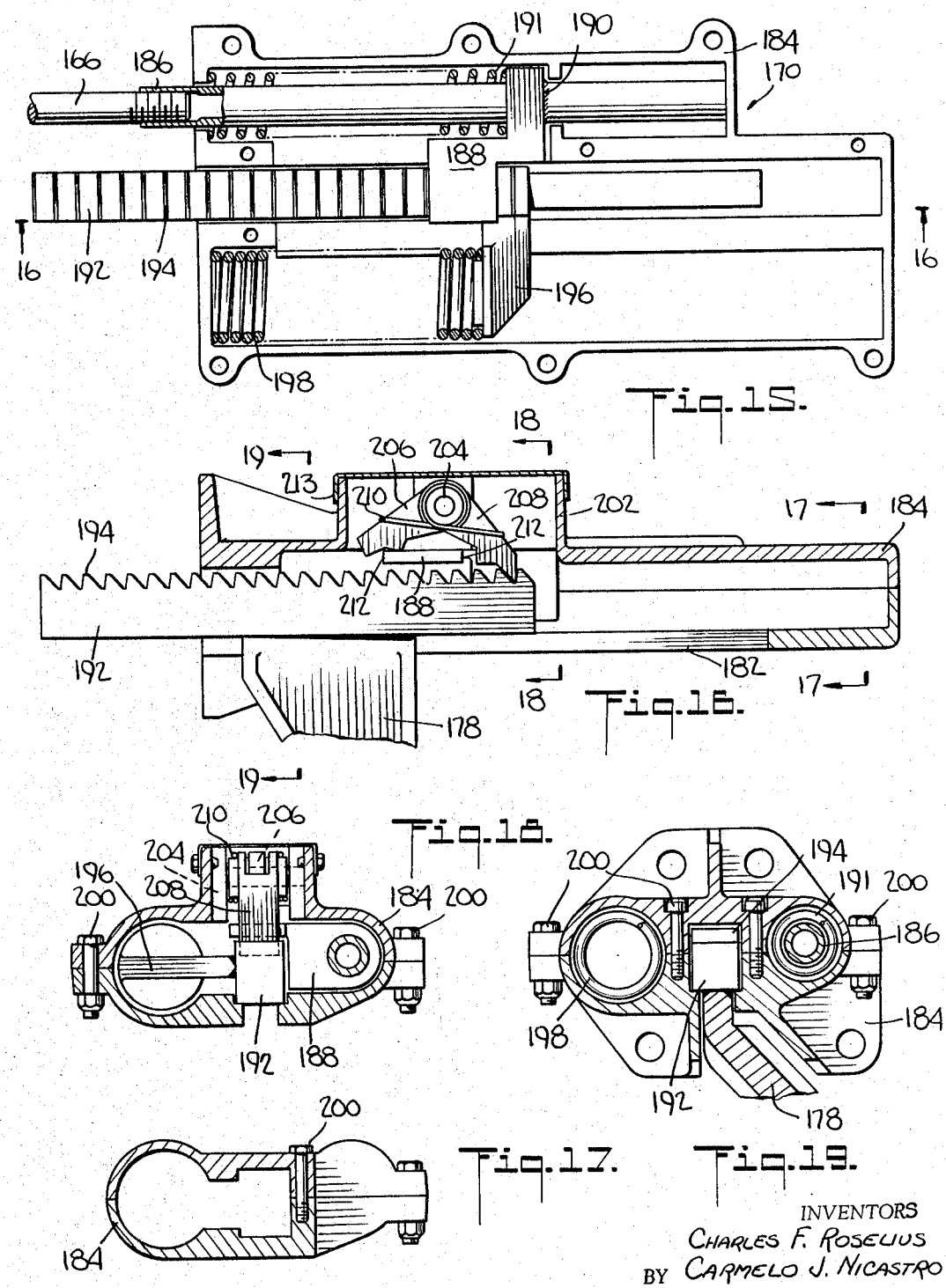

3,298,474
BRAKING SYSTEM
Charles F. Roselius, Bethpage, and Carmelo J. Nicastro, Flushing, N.Y., assignors, by mesne assignments, to Robert M. Holloway and Robert L. Ludington, Michigan City, Ind.
Filed July 24, 1964, Ser. No. 384,906
7 Claims. (Cl. 188—200)

This invention relates to brake mechanisms and more particularly to braking systems having means to eliminate slack in the system and to apply a constant force to the brake rigging of railway cars or the like.

The present invention concerns improvements in slack adjusting means described in the Mersereau Patent No. 3,001,612, and provides a number of advantages over this patent.

Braking systems embodying the present concept are particularly adapted, among other possible uses for use on railway cars which may be especially designed for particular ladings such as center-flow hopper cars, unusually large tank cars, and cars for transporting automobile trailer trucks (known as piggy-backs), for example.

Railway cars are known to be provided with brake shoes which operate by a fluid actuated cylinder and piston arrangement through the brake rigging including live levers, dead or fulcrum levers, and connecting rods. It will be appreciated that a set of wheels called trucks are disposed at each end of a car body. Heretofore, most of the mechanism required to transmit the force produced by the fluid operating cylinder and piston to the trucks has been located under and attached to the car body. Such prior art devices were not entirely satisfactory due to the long and complicated lever linkages required.

In view of the foregoing, a feature of this invention resides in the provision of a new and improved braking system which eliminates much of the lever linkage and connecting rods required in prior art devices, the eliminating of long linkages being particularly desirable. This results in a device that is inexpensive to manufacture and provides a lightweight structure, the latter factor being particularly important for freight hauling equipment since it increases the potential payload. Further, elimination of such lever linkages simplifies the structure and tends to reduce the maintenance cost thereof.

Another feature of this invention is the provision of a new and improved braking system which concentrates the entire brake mechanism for the car in two readily accessible locations. This simplifies the initial installation of such mechanism and more particularly simplifies the repair and maintenance operations. The braking system according to this invention may be readily installed on specially designed railway cars and it may be installed under or through the bolster, as desired.

Still another feature of this invention resides in the provision of a braking system which has small space requirements and yet provides mechanism strong enough to withstand high braking forces, such as 20,000 pounds, for example. It is particularly desirable to limit the space of the moving parts of the mechanism so that for safety purposes such moving parts may be enclosed in a housing.

Another feature of this invention is to provide a braking system which is reliable, convenient, practical and safe in operation.

The reservoir of air or fluid under pressure available in railway cars for actuating a cylinder and piston arrangement is of necessity limited. It is desirable, therefore, to properly balance the air or fluid under pressure in the reservoir with the air volume of the cylinder at a predetermined travel of the piston, because a piston of excessive travel creates a force considerably lower than that required and at the same time, at a time interval lagging behind adjacent cars. Conversely, a short piston or reduced travel creates a force considerably higher than that required and at the same time, at a time interval considerably ahead of the other cars. Such an operation causes a car as described under the first condition to roll ahead and impact the car ahead of it while the cars behind would tend to hold it back; and, in the case of the second operation, just the reverse would occur. That is, the car in question would have its brakes applied before the others, and hence, would hold back causing the cars behind it to bunch into it, and likewise holding back the cars ahead.

Excessive piston travel usually results from excessive slack in the brake rigging due to unadjusted shoe wear as well as wheel wear, rigging wear, deformations, for example.

Shortened piston travel usually results from worn out brake shoes which have been replaced by new shoes without a manual adjustment being made to compensate for the difference in thickness. This tends to eliminate all slack and shoe clearance, and thereby causes the shortened piston travel. It is an object of this invention to prevent excessive or shortened piston travel.

In essence, the present invention contemplates the provision of a novel braking system for a railway car having a truck carrying a pair of wheels, such system including a truck frame member, a fluid cylinder mounted on the frame member and a piston rod actuated thereby, and a first brake beam having portions which are selectively brought into frictional engagement with the first pair of wheels. The braking system further includes a second brake beam having portions which are selectively brought into frictional engagement with the second pair of wheels, and first lever means are provided for actuating the first brake beam in response to movement of the aforementioned piston rod. Second lever means are provided for interconnecting the first lever means and the second brake beam so that the second brake beam is actuated responsive to movement of the first lever means. Slack adjuster means are fixedly mounted on the frame member and a rod depends from one end thereof, such rod being connected to the first lever means for actuating the slack adjuster means in response to movement of the first lever. The slack adjuster is also provided with a depending fulcrum member which provides an adjustable fulcrum point for the aforementioned second lever means whereby the piston rod movement is maintained at a preselected distance.

Further, the slack adjuster means may comprise a first spring means which acts between the slack adjuster housing and the rod for urging the rod in a predetermined direction. An actuator is fixedly attached to the rod. A rack bar having rack teeth is movably mounted on the housing and is provided with a stop member transversely depending therefrom. A second spring means acts between the housing and the stop member for urging the bar in a predetermined direction. The first spring means, the second spring means and the rack bar are parallelly disposed in side by side relationship one with respect to the others. The fulcrum member may depend from the rack bar and said second lever means may be adapted to engage the fulcrum at a point, said point acting as a fulcrum point for the second lever means, the position of which point being determined by the slack in the brake mechanism whereby the piston rod movement is maintained at a preselected distance regardless of initial wear or slack in the brake mechanism.

Other features, objects and advantages will be apparent from the following description of several embodiments of the invention, and the novel features will be particularly pointed out hereinafter in connection with the appended claims.

In the accompanying drawings:

FIG. 1 is a plan view of a railway car truck having a brake system constructed in accordance with the concept of this invention;

FIG. 2 is a side elevation, partially broken away, showing the means for actuating the slack adjuster;

FIG. 3 is a fragmentary and elevation of the left hand end of the mechanism as viewed in FIG. 1 showing details of the means for actuating the slack adjuster;

FIG. 4 is a fragmentary end elevation of the right hand end of the mechanism as viewed in FIG. 1 showing additional details of the means for actuating the slack adjuster;

FIG. 5 is an enlarged, medial, longitudinal, sectional viwe of the slack adjuster constructed in accordance with the concept of this invention;

FIG. 6 is a sectional view taken along the line 6—6 of FIG. 5 showing the slack adjuster housing, fulcrum member, rack bar and pawls;

FIG. 7 is a sectional view taken along the line 7—7 of FIG. 6;

FIG. 8 is a sectional view taken along the line 8—8 of FIG. 6;

FIG. 9 is a sectional view taken along the line 9—9 of FIG. 6;

FIG. 10 is an enlarged sectional view of the slack adjuster similar to FIG. 5 but showing the pawls;

FIG. 11 is an enlarged sectional view taken along the line 11—11 of FIG. 10 and showing the pawls in one position of operation;

FIG. 12 is a sectional view similar to FIG. 11 except that the pawls and actuator are shown in a second position;

FIG. 13 is a fragmentary plan view of a railway car having a brake system constructed in accordance with another embodiment of this invention;

FIG. 14 is a side elevation, partially in section, of the brake system of FIG. 13;

FIG. 15 is a longitudinal sectional view of the slack adjuster according to the embodiment of the braking system of FIG. 13;

FIG. 16 is a sectional view taken along the line 16—16 of FIG. 15 and showing the rack bar, fulcrum member, actuator and pawl means;

FIG. 17 is a sectional view taken along the line 17—17 of FIG. 16;

FIG. 18 is a sectional view taken along the line 18—18 of FIG. 16; and

FIG. 19 is a sectional view taken along the line 19—19 of FIG. 16.

In the embodiment of the invention illustrated in FIGS. 1-12 incl., the railway car truck may be of any conventional type such as one having a frame 30 (FIG. 1) and side frames 32. A fluid cylinder 34 is mounted on the frame 30 as by means of bracket 36. The fluid cylinder 34 is provided with a piston rod 38 projecting therefrom and actuated thereby. The fluid cylinder 34 is provided with an inlet connection 40 for the fluid means (not shown). One end of the piston rod 38 is fixedly attached to a floating swivel 42, said swivel also being attached to a lever 44 (FIGS. 1 and 4). It will be appreciated that the travel or movement of the piston rod 38 is limited to a substantially constant preselected distance so that the braking forces of a series of railway cars will be substantially uniform.

A support bracket 46 depends from the frame 30 and the lever 44 is pivotally attached thereto as at fulcrum 48 (FIG. 1). Still referring to FIG. 1, a shackle 50 is connected to the other end of the lever 44 and is also connected to one end of a truck live lever 52, the other end of the truck live lever 52 being pivotally connected to a strut 54 as by means of pin 56. The strut 54 is one member of a first brake beam designated generally at 58 (FIG. 1), which brake beam also includes a pair of arms 60 and a brake beam cross member 62.

The outer portion of the brake beam 58 is provided with brake shoes 64 (FIG. 1) which bear against the wheel tread 66 of a first pair of wheels 68, said wheels being interconnected one with the other by an axle 70.

In operation the force exerted by an application of fluid to the fluid cylinder 34 is transmitted to the piston rod 38 and through the aforementioned linkage to the brake beam 58, thereby forcing the shoes 64 against the wheel treads 66.

As best seen in FIG. 2, truck live lever 52 is medially pivotally connected to one end of a truck lever connector 72, the end of the lever connector being yoke shaped for the purpose. The lever connector 72 passes through the bolster 74 and the other end of the connector is also yoke shaped for pivotal attachment to a truck dead lever 76. One end of truck dead lever 76 is pivotally connected to a strut 78 of a second brake beam designated generally at 80 (FIG. 1). In this manner actuation of the first brake beam 58 is simultaneously accompanied by actuation of the second brake beam 80 through the lever connector 72.

The second brake beam 80 includes a pair of arms 82 and a brake beam cross member 84. The outer portions of the brake beam 80 are provided with brake shoes 86 which bear against the wheel tread 88 of a pair of wheels 90, said wheels being interconnected by means of axle 92.

As seen in FIGS. 1 and 2, a slack adjuster 94 is connected to the main frame 30 as by means of bolts 96. The slack adjuster 94 is provided with a projecting fulcrum member 98 which projects through slot 100 in the slack adjuster 94. As best seen in FIGS. 1-3, the truck dead lever 76 engages the fulcrum member 98 at a point 102, said point acts as a fulcrum point for the truck dead lever. It should be appreciated that the edges of the truck dead lever 76 are contoured and the fulcrum member 98 is slidable in the slot 100 (FIG. 1) so that the position of the fulcrum point 102 is variable depending upon the position of the fulcrum member 98, which position is determined by the slack adjuster 94 as will be explained more fully hereinafter.

Reverting to FIG. 1, an actuating rod 104 projects from one end of the slack adjuster 94. It will be appreciated that the actuating rod 104 may be actuated by any of the levers of the system which move proportionately to the movement of the piston rod 38. The preferred embodiment provides sufficient movement in the right direction without the necessity of multiplying linkage or directional change linkage and will be described in connection therewith. As best seen in FIG. 4, a stop 106 is fixedly attached to lever 44, the stop being slotted as at 108 to receive a flattened end of the rod 104. The rod 104 is provided with a stop 110 (FIGS. 1 and 2) for providing an operable interconnection between lever 44 and rod 104.

In operation in order to set the brakes, fluid is admitted under pressure to the cylinder 34 to force the piston rod 38 to the right as viewed in FIG. 1. This pivots lever 44 about the support bracket 46, pivots the truck live lever 52, actuates the first brake beam 58, moves the lever connector 72, and pivots the truck dead lever 76 about fulcrum point 102 to actuate the second brake beam 80. Thus, brake beams 58 and 80 move outwardly as viewed in FIG. 1 to press their respective brake shoes 64 and 86 against the wheel treads 66 and 88 of the wheels 68 and 90, respectively. It is seen that the movement or travel of the brake shoes 64 and 86 depends upon the position of the fulcrum point 102. It is also seen that the necessary travel of the piston rod 38 for moving the brake beams 58 and 80 a sufficient distance in order to apply the brake shoes to the wheels is dependent upon the position of the fulcrum point 102. The slack adjuster 94 positions the fulcrum member 98 in response to movement of the actuating rod 104. Upon the aforementioned admission of fluid to the cylinder 34, the lever 44 with it stop 106 moves to the left as viewed in FIG. 1 until it strikes stop 110 on rod 104, thereby actuating the slack adjuster 94.

In order to release the brakes, the air pressure in cylinder 34 is released, thereby permitting all of the parts to return to their normal or original positions. That is, the piston rod 38 moves to the left as viewed in FIG. 1, and through the aforementioned linkages the brake beams 58 and 80 move inwardly as viewed in FIG. 1 to release the brake shoes from the wheel treads. The stop 106 on lever 44 travels to the right releasing the pressure on stop 110 on rod 104, thereby permitting springs disposed within the slack adjuster 94 to return the components therein to their original positions as will be discussed more fully hereinafter.

Referring to FIG. 5, details of the construction of the slack adjuster designated generally at 94 will be discussed. The slack adjuster 94 comprises a housing 112, and a first coil spring 114 which acts between the housing 112 and the rod 104 for urging the rod to the right as viewed in FIG. 5. An actuator 116 is fixedly attached to the rod 104 as at 118. A rack bar 120 having teeth 122 (FIG. 6) is adapted for movement within the housing 112. A stop member 124 transversely depends from the rack 120 as shown in FIG. 5, and a second coil spring 126 acts between the housing 112 and the stop member 124 for urging the rack bar to the right as viewed in FIG. 5. As best seen in FIGS. 6 and 7, the rack 120 is provided with a depending fulcrum member 98 which is fixedly attached thereto as at 128. FIGS. 7, 8 and 9 show the relative positioning of the slack adjuster components within the housing 112. It is noted that the first spring means 114, the second spring means 126 and the rack bar 120 are parallelly disposed in side by side relationship one with respect to the other, and thereby form a short, compact unit which is readily contained within one truck of a railway car.

As is best seen in FIG. 6, the housing 112 is provided with a projecting portion 130 having an inwardly depending support member 132 which supports shaft 134 on which is mounted a locking pawl 136 and a load pawl 138.

The pawls 136 and 138 are urged toward the rack teeth 122 by spring 140 (FIGS. 10, 11 and 12). As best seen in FIGS. 11 and 12, the locking pawl 136 has a portion which is engageable with the rack teeth 122 and the load pawl 138 has a portion which is engageable with the opposite side of the rack teeth 122. It will be noted that locking pawl 136 prevents movement of the rack 120 to the right and the load pawl 138 prevents movement of the rack 120 to the left as viewed in FIG. 12.

The actuator 116 is provided with cam surfaces 142 which are adapted to engage the pawls 136 and 138. When the actuator 116 is moved axially of the housing 112, to the left as viewed in FIG. 12, the cam surface 142 engages the pawl 136, thereby disengaging the pawl from the rack teeth 122 as shown. Conversely, when the actuator 116 is moved to the right cam surface 142 engages pawl 138 and disengages this pawl from the rack teeth 122. It will be appreciated that the pawls 136 and 138 are so positioned with relation to the cam surfaces 142 that both pawls will momentarily disengage the rack teeth 122 permitting the rack 120 to move in either direction as required by the shoe clearances on the truck. (FIG. 11.)

When the brakes are applied, fluid under pressure is supplied to the fluid cylinder 34 (FIG. 1) to move the piston rod 38 to the right as viewed in FIG. 1. Lever 44 is pivoted about point 48 so that stop 106 moves to the left as viewed in FIG. 1 until it strikes stop 110 on rod 104 thereby moving rod 104 to the left as viewed in FIGS. 1 and 10, against the pressure of the spring 114 (FIG. 10). The actuator 116 being secured to the rod 104 also moves to the left as viewed in FIGS. 10, 11 and 12 carrying the cam surface 142 to the left until it strikes the adjoining abutment of pawl 136, thereby lifting pawl 136 from engagement with teeth 122 and at the same time permitting pawl 138 to drop off the right end of the cam 142 and engage the rack teeth 122.

However, pawls 136 and 138 are so positioned with respect to the cam surfaces 142 that both pawls will be momentarily disengaged from rack teeth 122 permitting the rack 120 to move in either direction as required by the shoe clearances on the truck. For example, assuming that the shoes had worn, the spring 126 actuating the rack 120 by the stop 124 moves the rack to the right as viewed in FIGS. 5, 6 and 10, thereby moving the fulcrum member 98 which is also secured to the rack 120 to the right as viewed in FIG. 6. This moves the fulcrum point 102 (the point where the fulcrum member 98 engages the truck dead lever 76) to the right toward the center line of the truck as viewed in FIG. 1, and thereby takes up the excessive slack or clearance between the face of the shoes 64, 86 and the wheel treads 66, 88, respectively. It will be appreciated that the spring 126 (FIG. 10) supplies sufficient force to the stop 124 on the rack bar 120 to take up any slack in the brake rigging when the pawls are disengaged. However, the spring 126 is not strong enough to cause the brake shoes 64 and 86 (FIG. 1) to exert any appreciable pressure on the wheels 68 and 90 on the railway car when the pawls are disengaged from the rack teeth 122. The spring 114 is merely strong enough to return the rod 104 and actuator 116 to their right hand positions as viewed in FIG. 5.

When the brakes are further applied by adding additional fluid to the cylinder 34 (FIG. 1), the actuator 116 moves further to the left as viewed in FIG. 12. At this point the pawl 136 is held in its disengaged position by the actuator 116 and pawl 138 is urged by the spring 140 into engagement with the teeth 122 of the rack bar 120 to lock the slack adjuster in the position as illustrated in FIG. 12. The fulcrum point 102 remains in a fixed position.

When the brakes are released, the fluid pressure in cylinder 34 (FIG. 1) is released, thereby permitting the parts to return to their original positions wherein the piston rod 38 is in its retracted position, lever 44 is pivoted to such a position wherein the stop 106 travels to the right as viewed in FIG. 1, releasing the pressure on the stop 110 on the rod 104, and thereby permitting the spring 114 to return the rod 104 and the actuator 116 to the right as viewed in FIG. 5. At the same time, the cam surface 142 (FIGS. 11 and 12) raises the pawl 138 into its disengaged position while spring 140 rotates pawl 136 into engagement with the rack teeth 122 of the rack 120. The slack adjuster 94 is thereby locked in its released position.

In operation when one or more of the shoes 64 or 86 (FIG. 1) have become worn to the point of replacement and have been replaced without disturbing any portion of the brake mechanism, the braking system is automatically readjusted to compensate for the new shoes. Fluid is admitted to the cylinder 34 (FIG. 1) and the brake shoes 64 and 86 are brought against the wheel treads 66 and 88, respectively, before the stop 110 on rod 104 contacts the stop 106 on lever 44. This means that the position of the fulcrum point 102 on lever 76 is too close to the center line of the truck, and hence the shoe pressure causes the lever 76 to force the fulcrum member 98 to move to the left as viewed in FIGS. 1 and 6. The fulcrum member 98 is attached to the rack 120, and therefore the rack 120 moves to the left as viewed in FIGS. 6, 11 and 12. At this time the pawl 138 is still in its disengaged position and pawl 136 is pivotally free to ratchet over the teeth 122 as they move to the left as viewed in FIGS. 11 and 12. Hence, the fulcrum point 102 (FIG. 1) is moved a sufficient distance to the left as viewed in FIG. 1 to properly reestablish the travel of piston 38 and the brake shoe-wheel tread clearance.

A second embodiment of the invention is illustrated in FIGS. 13-19, incl., wherein a truck of a railway car is shown having a frame member 144, a fluid cylinder 146 mounted on the frame member 144, and a piston rod 148 extending from the fluid cylinder 146 and being pivotally connected to one end of a first lever 150. The other end of the lever 150 is pivotally connected to the frame member 144 as by means of bracket and pin 152. A truck live lever 153 is adapted to frictionally engage the lever 150 as at 154 (FIG. 13). The other end of the truck live lever 153 is pivotally connected to a truck lever connector 156.

A strut 158 of a first brake beam, designated generally at 160 (FIG. 13), is pivotally mounted on the medial portion of the truck live lever 153 as by means of pin 162. The first brake beam 160 acts in a manner similar to that described in connection with the first brake beam 58 shown in FIG. 1. The first lever 150 is provided with a projecting stop portion 164 (FIGS. 13 and 14) and rod 166 is provided with a stop portion 168, rod 166 extending from the slack adjuster designated generally at 170 (FIGS. 13 and 14).

The other end of the truck lever connected 156 (FIGS. 13 and 14) is pivotally connected to a truck dead lever 172, said truck dead lever being medially pivotally connected to a strut 174 of a second brake beam frame designated generally at 176. The brake beam 176 is constructed and operates in a manner similar to that described in connection with brake beam 80 (FIG. 1). A fulcrum member 178 (FIG. 13) projects from the slack adjuster 170 establishing a fulcrum point 180 for the truck dead lever 172. It is noted that the slack adjuster 170 is provided with an elongated slot 182 so that the fulcrum member 178 may be adjusted to position the fulcrum point 180 to compensate for variations in the brake rigging slack, and thereby maintain the stroke or travel of the piston rod 148 substantially constant.

As best seen in FIG. 15, the slack adjuster 170 comprises a housing 184 which receives an extension 186 of rod 166. An actuator 188 is fixedly connected to the rod 186 as by means of welding 190 (FIG. 15). A first coil spring 191 is mounted in the housing 184 for acting between the housing 184 and the actuator 188 for urging the rod 186 to the right as viewed in FIG. 15. A rack bar 192 having teeth 194 is slidably mounted in the housing 184. A stop member 196 is carried by the rack 192, and a second coil spring 198 acts between the housing 184 and the stop 196 urging the stop 196 as well as the rack 192 to the right as viewed in FIG. 15. It will be appreciated that the first spring 191, the second spring 198, and the rack bar 192 are parallelly disposed in side by side relation (FIG. 15), thereby providing a short compact structure.

The housing 184 comprises an upper and a lower portion which are bolted one to the other by means of bolts 200 (FIGS. 17, 18 and 19) for purposes of assembly and disassembly. As best seen in FIG. 15, the fulcrum member 178 is fixedly connected to the rack bar 192, and the fulcrum member 178 is slidable within the slot 182 in the housing 184.

The housing 184 is provided with a projecting portion 202 (FIG. 16) which contains a shaft member 204 for purposes of mounting a locking pawl 206 and a load pawl 208 (FIGS. 16 and 18). A spring member 210 (FIG. 16) is positioned to urge the pawls 206 and 208 towards their position of engagement with the teeth 194 of the rack bar 192. The actuator 188 is provided with cam surfaces 212 (FIG. 16) for purposes of engaging the pawls 206 and 208, the locking pawl 206 being provided with a projecting portion which is engageable with a portion of the actuator 188 (FIG. 16) and the load pawl 208 being provided with a projecting portion which is engageable with a portion of the actuator 188. When the actuator 188 is moved axially of the housing 184, to the left as viewed in FIG. 16, pawl 206 is engaged by the actuator 188 and rides on the upper surface thereof, and hence is disengaged from the teeth 194 of the rack bar 192. In a similar manner when the actuator 188 is moved to the right as viewed in FIG. 16, the actuator engages the load pawl 208 and disengages same from the teeth 194 of the rack bar 192. In order to keep the pawl mechanisms free from dirt, a cover 213 (FIG. 16) is provided for the purpose.

In operation when the brakes are released, that is when the piston rod 148 (FIG. 13) is in its retracted position, lever 150 pivots clockwise about pin 152, the medial portion of the truck live lever 153 moves inwardly, and the first brake beam frame 160 moves inwardly. The truck dead lever 172, being connected to the truck live lever 153 by connector 156, also moves inwardly, the second brake beam frame 176 moves inwardly, and the brakes are disengaged. The spring 191 (FIGS. 15 and 19) urges the actuator 188 to the right as viewed in FIG. 15 and hence the load pawl 208 (FIG. 16) is disengaged and the locking pawl 206 engages the teeth 194 of the rack 192.

When setting the brakes, fluid under pressure is supplied to the fluid cylinder 146 (FIG. 13), piston rod 148 is extended to the left as viewed in FIG. 13, the lever 150 pivots about pin 152 in a counterclockwise direction as viewed in FIG. 13, thereby moving truck live lever 153 outwardly. Through the truck lever connector 156, the medial portion of the truck dead lever 172 moves outwardly because the truck dead lever 172 pivots about fulcrum point 180. As a result of the outward movement of the truck live lever 153 and the truck dead lever 172, the brake beams 160 and 176, respectively, move outwardly to their braking positions.

As seen in FIGS. 13 and 14 counterclockwise pivotal movement of the lever 150 moves the stop 164 into engagement with stop 168 of the rod 166 and thereby moves the rod 166 to the left as viewed in FIGS. 13 and 14. As best seen in FIG. 15, movement of the rod 166 to the left moves the extension 186 to the left, which in turn moves the actuator 188 to the left. Due to the movement of the actuator 188 to the left as viewed in FIG. 16, the cam surface 212 engages the locking pawl 206 and disengages same from the teeth 194 of the rack 192.

At an intermediate stage in the application of the brake, the actuator 188 (FIG. 15) will be in such a position that both of the pawls 206 and 208 will be supported by the upper surface of the actuator 188 and hence the pawls will be out of engagement with the rack teeth 194. At this time, if there is slack in the brake rigging, the rack bar 192 will move to the right, as seen in FIG. 15, with respect to the housing 184 under the force of the spring 198, thereby moving the fulcrum member 178 (FIG. 16) to the right along the slot 182. As seen in FIG. 13 when the fulcrum member 178 is moved to the right, point 180 is also moved to the right and thereby takes up the slack in the rigging and retains the movement of the rod 148 (FIG. 13) substantially constant whenever the brakes are applied regardless of the slack. It will be appreciated that the spring 198 (FIG. 15) supplies sufficient force to the rack 192 to take up any slack in the brake rigging when the locking pawls are disengaged. However, the spring 198 is not strong enough to cause any appreciable braking pressure when the pawls are disengaged from the teeth 194. The spring 191 is merely strong enough to return the actuator 188 to its original position.

When the brakes are further applied by adding additional fluid to the fluid cylinder 146 (FIG. 13), the lever 150 moves further in a counterclockwise direction and hence moves the stop 164 to the left as viewed in FIG. 13. The stop 168 on the actuating rod 166 is moved to the left as viewed in FIG. 13, and the rod 166 moves to the left as viewed in FIG. 15. Consequently, the actuator 188 (FIG. 16) moves to the left and retains the locking pawl 206 in its disengaged position, but allows the load pawl 208 to engage the teeth 194 of the rack 192. This locks the slack adjusting mechanism in position and the fulcrum point 180 (FIG. 13) remains in a fixed position as the full braking force is applied to the wheels.

When the brakes are released the cycle operation described above is repeated in reverse order so that the parts return to their original position.

In the event that the fulcrum point 180 must be moved to the left as viewed in FIG. 13, for example, because of the replacement of worn brake shoes by new brake shoes, fluid is supplied to the fluid cylinder 146, and the brake beams 160 and 176 move outwardly to the limit of their travel before the stop 164 engages the stop 168 on rod 166. This means that the position of the fulcrum point 180 is too far to the right as viewed in FIG. 13 and hence the shoe pressure causes the lever 172 to force the fulcrum member 178 to move to the left as viewed in FIGS. 13 and 16. The fulcrum member 178 is attached to the rack 192, and therefore, the rack 192 moves to the left as viewed in FIG. 16. At this time the pawl 208 is still in its disengaged position and pawl 206 is pivotally free to ratchet over the teeth 194 as they move to the left as viewed in FIG. 16. Hence, the fulcrum point 180 (FIG. 13) is moved a sufficient distance to the left as viewed in FIG. 13 to properly reestablish the travel of piston rod 148. Thence, the braking forces are transmitted in the aforementioned manner to the brake beams and the load pawl 208 again engages the teeth 194 to lock the fulcrum member 178 in position.

It will be appreciated that the slack adjuster is in effect a double-acting device and serves to maintain the travel of the piston rod at a preselected amount automatically, and hence the braking force is uniformly applied in each car of a series of cars. Thus, the possibility of some cars being held back while other cars roll ahead is substantially eliminated.

It will be understood that various changes in the details, materials and arrangements of parts which have been herein described and illustrated in order to explain the nature of the invention, may be made by those skilled in the art within the principle and scope of the invention, as expressed in the appended claims.

What is claimed and desired to be secured by Letters Patent is:

1. A brake mechanism for a railway car truck having a pair of wheels, said mechanism comprising a frame member, a fluid cylinder mounted on said frame member, a piston rod actuated by said fluid cylinder, a first lever pivotally mounted on said frame member having one end pivotally connected to said piston rod, a brake beam having portions which are frictionally engageable with said pair of wheels, a truck live lever pivotally connected to said brake beam and being moveable in response to movement of said first lever, lever means establishing a pivot point for said truck live lever, and a slack adjuster for eliminating the slack in the brake mechanism, said slack adjuster having an adjustable fulcrum member frictionally engageable by said lever means for providing an adjustable fulcrum point along the side of said lever means, and said slack adjuster having adjusting means for controlling the position of said fulcrum member, said adjusting means having a portion thereof engageable with said first lever.

2. A brake mechanism for a railway car truck having a pair of wheels, said mechanism comprising a frame member, a fluid cylinder mounted on said frame member, a piston rod actuated by said fluid cylinder, a first lever centrally pivotally mounted on said frame member having one end swivelly connected to said piston rod, a brake beam having portions which are frictionally engageable with said pair of wheels, a truck live lever having one end pivotally connected to said brake beam and having the other end thereof shackled to the other end of said first lever, lever means establishing a medial pivot point for said truck live lever, a slack adjuster for eliminating the slack in the brake mechanism, said slack adjuster having an adjustable fulcrum member frictionally engageable by said lever means for providing an adjustable fulcrum point along the edge of said lever means, and said slack adjuster having adjusting means for controlling the position of said fulcrum member, said adjusting means having a portion thereof engageable with said first lever.

3. A brake mechanism for a railway car truck having a pair of wheels, said mechanism comprising a frame member, a fluid cylinder mounted on said frame member, a piston rod actuated by said fluid cylinder, a first lever having one end which is pivotally mounted on said frame member and the other end thereof being pivotally connected to said piston rod, a brake beam having portions which are frictionally engageable with said pair of wheels, a truck live lever centrally pivotally connected to said brake beam and having one end frictionally engaging said first lever for movement in response to movement of said first lever, lever means establishing a pivot point at the other end of said truck live lever, a slack adjuster for eliminating the slack in the brake mechanism, said slack adjuster having an adjustable fulcrum member frictionally engageable by said lever means for providing an adjustable fulcrum point along the edge of said lever means, and said slack adjuster having adjusting means for controlling the position of said fulcrum member, said adjusting means having a portion thereof engageable with said first lever.

4. A brake system for a railway car truck having a first and a second pair of wheels, said system comprising a frame member, a fluid cylinder mounted on said frame member, a piston rod actuated by said fluid cylinder, a first lever centrally pivotally mounted on said frame member, a floating swivel connecting one end of said first lever with said piston rod, a truck live lever, shackle means interconnecting one end of said truck live lever with the other end of said first lever, a first brake beam having portions which are frictionally engageable with said first pair of wheels, said truck live lever having the other end thereof pivotally connected to a medial portion of said first brake beam, a truck dead lever, a truck lever connector interconnecting the medial portions of said truck live lever with said truck dead lever, a second brake beam having portions which are frictionally engageable with said second pair of wheels, one end of said truck dead lever being pivotally connected to a medial portion of said second brake beam, a slack adjuster fixedly mounted on said frame member, a rod extending from said slack adjuster and engageable with said first lever for actuating said slack adjuster in response to movement of said first lever, and said slack adjuster having an adjustable fulcrum member frictionally engageable by said truck dead lever for establishing a fulcrum point for said dead lever, the position of said fulcrum point being determined by said slack adjuster, said slack adjuster comprising a housing, a rack bar having rack teeth being movably mounted on said housing, spring means acting between said housing and said rack bar for urging said bar in a predetermined direction; a locking pawl and a load pawl mounted on said housing adjacent said teeth and engageable respectively with opposite sides of said teeth for respectively preventing movement of said bar in said direction and in an opposite direction; means engaging said pawls for moving said pawls into engagement with said teeth; an actuator fixedly attached to said rod and movably mounted with respect to said housing and engageable with said pawls, said actuator, in a first position thereof engaging and holding said load pawl out of engagement with said teeth and permitting said locking pawl to engage said teeth, and said actuator, in a second position thereof, engaging and holding said locking pawl out of engagement with said teeth and permitting said load pawl to engage said teeth, and said fulcrum member being fixedly connected to said rack bar.

5. A brake system for a railway car truck having a first and a second pair of wheels, said system comprising a frame member, a fluid cylinder mounted on said frame member, a piston rod actuated by said fluid cylinder, a first lever having one end pivotally mounted on said frame member and having the other end thereof pivotally connected to said piston rod, a truck live lever having one end adapted to frictionally engage said first lever and said truck live lever being movable in response to movement of said first lever, a first brake beam having portions which are frictionally engageable with said first pair of wheels, said truck live lever having the medial portion thereof pivotally connected to a medial portion of said first brake beam, a truck dead lever, a truck lever connector interconnecting the other end of said truck live lever with one end of said truck dead lever, a second brake beam having portions which are frictionally engageable with said second pair of wheels, a medial portion of said truck dead lever being pivotally connected to a medial portion of said second brake beam, a slack adjuster fixedly mounted on said frame member, a rod extending from said slack adjuster and engageable with said first lever for actuating said slack adjuster in response to movement of said first lever, and said slack adjuster having an adjustable fulcrum member frictionally engageable by said truck dead lever for establishing a fulcrum point for said dead lever, the position of said fulcrum point being determined by said slack adjuster, said slack adjuster comprising a housing, a rack bar having rack teeth being movably mounted on said housing, said fulcrum member being fixedly attached and movable with said rack bar, spring means acting between said housing and said rack bar for urging said bar in a predetermined direction; a locking pawl and a load pawl mounted on said housing adjacent said teeth and engageable respectively with opposite sides of said teeth for respectively preventing movement of said bar in said direction and in an opposite direction; means engaging said pawls for moving said pawls into engagement with said teeth; an actuator fixedly attached to said rod and movably mounted with respect to said housing and engageable with said pawls, said actuator in a first position thereof, engaging and holding said load pawl out of engagement with said teeth and permitting said locking pawl to engage said teeth and said actuator, in a second position thereof, engaging and holding said locking pawl out of engagement with said teeth and permitting said load pawl to engage said teeth.

6. A braking system for a railway car truck having a first pair of wheels and a second pair of wheels, said braking system comprising a frame member, a fluid cylinder mounted on said frame member, a piston rod actuated by said fluid cylinder, a first lever mounted on said frame member, said piston rod being pivotally interconnected to one end of said first lever, a truck live lever pivotally connected to said brake beam and being movable in response to movement of said first lever, a first brake beam having a brake beam cross member, a pair of arms having the ends thereof connected to the end of said cross member respectively, a strut interconnecting the medial portion of said cross member with the other ends of said arms respectively, brake shoes carried by the ends of said cross member for frictionally engaging said first pair of wheels, said truck live lever being pivotally mounted on said strut, a second brake beam having brake shoes which are frictionally engageable with said second pair of wheels, said second brake beam comprising a brake beam cross member, a pair of arms having the ends thereof connected to the ends of said cross member respectively, a strut interconnecting the medial portion of said cross member with the other end of said arms respectively, the ends of said cross member carrying said brake shoes respectively; a truck dead lever pivotally connected to the strut of the second brake beam, a truck lever connector pivotally interconnecting said truck live lever with said truck dead lever, a slack adjuster fixedly mounted on said frame member, a rod depending from said slack adjuster and adapted to engage said first lever for actuating said slack adjuster in response to movement of said first lever, said slack adjuster means comprising a housing, first spring means acting between said housing and said rod for urging said rod in a predetermined direction, an actuator fixedly attached to said rod, a rack bar having rack teeth being movably mounted on said housing, a stop member transversely depending from said rack, second spring means acting between said housing and said stop member for urging said bar in a predetermined direction, said first spring means and said second spring means and said rack bar being parallelly disposed in side by side relation, one with respect to the others, a locking pawl and a load pawl mounted on said housing adjacent said teeth and engageable respectively with opposite sides of said teeth for respectively preventing movement of said bar in said direction and in an opposite direction; means engaging said pawls for moving said pawls into engagement with said teeth; said actuator being engageable with said pawls, said actuator, in a first position thereof, engaging and holding said load pawl out of engagement with said teeth and permitting said locking pawls to engage said teeth, and said actuator, in a second position thereof, engaging and holding said locking pawl out of engagement with said teeth and permitting said load pawl to engage said teeth, a fulcrum member depending from said rack bar and passing outwardly of said housing, said truck dead lever being adapted to engage said fulcrum at a point, said point acting as a fulcrum point for said truck dead lever, the position of said point being determined by the slack in said brake mechanism, whereby the piston rod movement is maintained at a preselected distance.

7. A slack adjusting device comprising a housing, a rod extending outwardly of said housing, first spring means acting between said housing and said rod for urging said rod in a predetermined direction, an actuator fixedly attached to said rod, a rack bar having rack teeth being movably mounted on said housing, a stop member transversely depending from said rack, second spring means acting between said housing and said stop member for urging said bar in a predetermined direction, said first spring means and said second spring means and said rack bar being parallelly disposed in side by side relation, one with respect to the others, a locking pawl and a load pawl mounted on said housing adjacent said teeth and engageable respectively with opposite sides of said teeth for respectively preventing movement of said bar in said direction and in an opposite direction; means engaging said pawls for moving said pawls into engagement with said teeth; said actuator being engageable with said pawls, said actuator, in a first position thereof, engaging and holding said load pawl out of engagement with said teeth and permitting said locking pawls to engage said teeth, and said actuator, in a second position thereof, engaging and holding said locking pawl out of engagement with said teeth and permitting said load pawl to engage said teeth, and a fulcrum member angularly depending from said rack bar and passing outwardly of said housing.

References Cited by the Examiner
UNITED STATES PATENTS

| | | | |
|---|---|---|---|
| 2,181,041 | 11/1939 | Baselt | 188—52 |
| 2,886,145 | 5/1959 | Vaught et al. | 188—196 X |
| 3,001,612 | 9/1961 | Mersereau | 188—196 |
| 3,266,601 | 8/1966 | Taylor | 188—52 |

DUANE A. REGER, *Primary Examiner.*